United States Patent [19]

Suzuki

[11] Patent Number: 5,081,373
[45] Date of Patent: Jan. 14, 1992

[54] CIRCUIT AND METHOD FOR SAMPLING DIGITAL DATA

[75] Inventor: Mitsuo Suzuki, Hino, Japan

[73] Assignee: Kabushiki Kaisha Toshiba, Kawasaki, Japan

[21] Appl. No.: 697,732

[22] Filed: May 3, 1991

Related U.S. Application Data

[63] Continuation of Ser. No. 400,809, Aug. 30, 1989, abandoned.

[30] Foreign Application Priority Data

Sep. 27, 1988 [JP] Japan .................... 63-241509

[51] Int. Cl.⁵ .................. H03K 17/00; G11C 27/02
[52] U.S. Cl. .................... 307/353; 307/242; 307/352; 307/279
[58] Field of Search .............. 307/352, 353, 272.2, 307/279, 242

[56] References Cited

U.S. PATENT DOCUMENTS 4,066,919  1/1978  Huntington .............. 307/353
4,823,027  4/1989  Takahashi .............. 307/353

Primary Examiner—John Zazworsky
Attorney, Agent, or Firm—Finnegan, Henderson, Farabow, Garrett, and Dunner

[57] ABSTRACT

A sampling circuit is disclosed which samples input data in synchronism with a clock pulse. The sampling circuit comprises first and second sampling units. The first sampling unit includes a first input gate for receiving input data when a clock pulse signal level is in a first state (for example, "H"), a first holding unit for receiving data via the input gate, and a first output gate for outputting hold data of the first holding unit when the clock pulse signal level is a second state (for example, "L"). The second sampling unit includes a second input gate for receiving data when the clock pulse signal level is in the second state, a second holding unit for holding the data which is received via the second input gate and a first holding unit for outputting hold data of the first holding unit when the clock pulse signal level is in the first state. According to the aforementioned circuit, an output of an unsampled one of the two sampling units is output through a corresponding output gate, and it is possible to obtain a sampling frequency which is double that of the sampling clock.

10 Claims, 3 Drawing Sheets

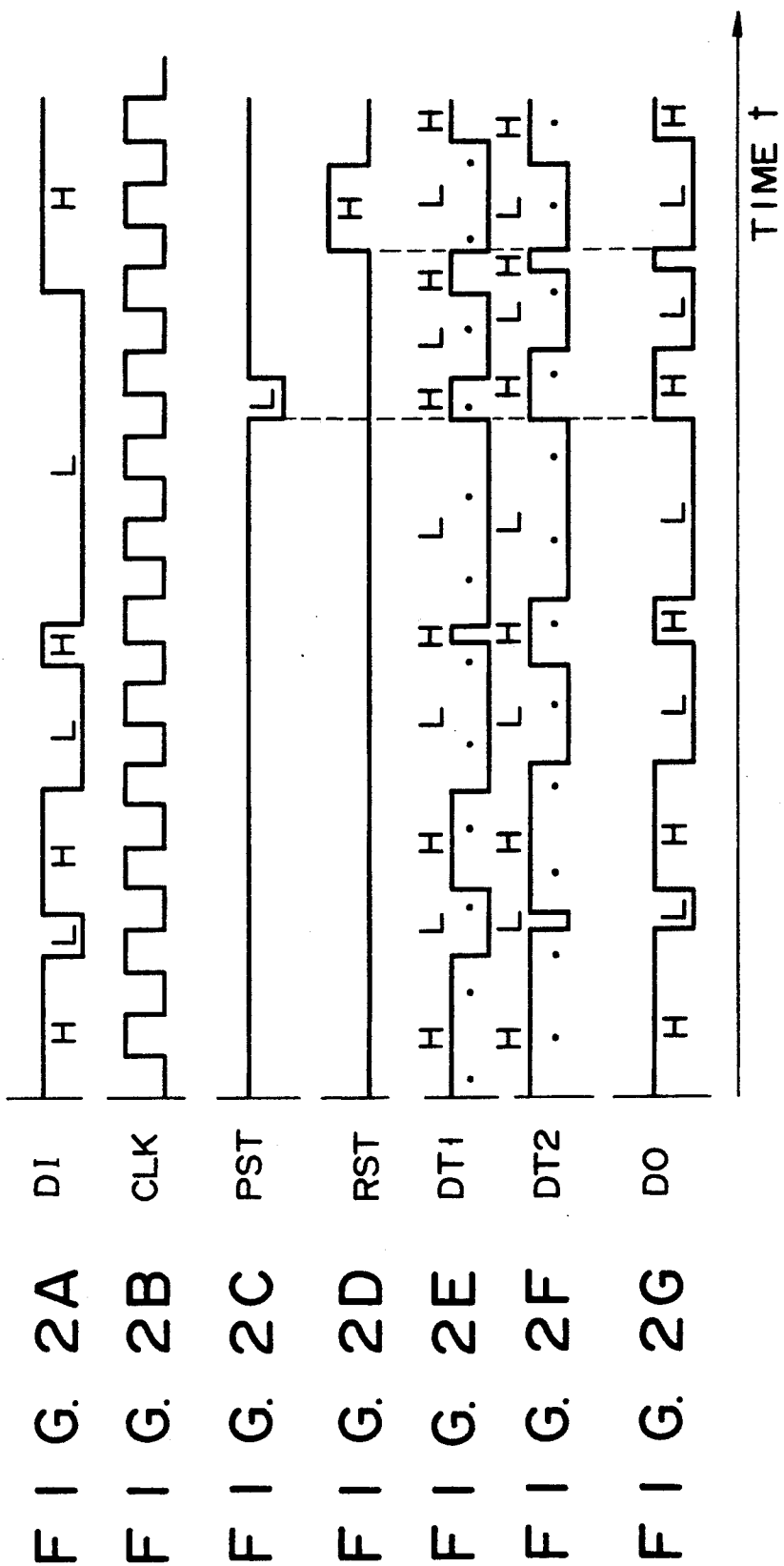

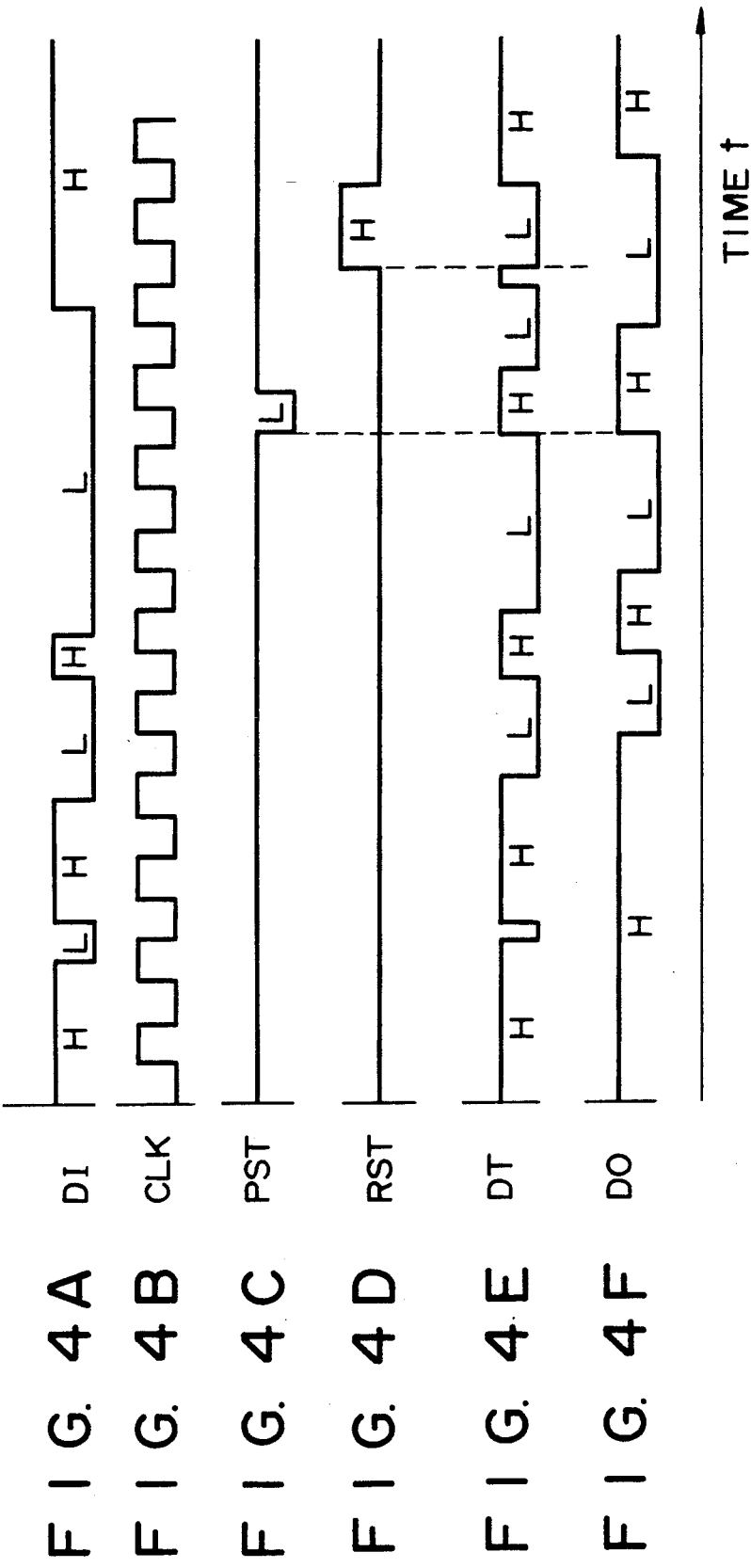

CIRCUIT AND METHOD FOR SAMPLING DIGITAL DATA

This application is a continuation of application Ser. No. 07/400,809, filed Aug. 30, 1989, now abandoned.

BACKGROUND OF THE INVENTION

1. Field of the Invention

The present invention relates to a sampling circuit and method for sampling digital data.

2. Description of the Related Art

In an electronic apparatus for electronic exchange and data transfer, a sampling circuit as shown in FIG. 3 is employed for sampling digital data. The sampling circuit it uses a D type flip-flop IC (integrated circuit), one of the existing general-purpose IC, as shown in FIG. 3. As shown in FIG. 3, the sampling circuit is composed of tri-state inverters 11, 12, 21 and 22.

The tri-state inverters 11, 12, 21 and 22 have their own input signals prevented from emerging as their own output signals when their control gates receive logic level "H" signal and have their own input signals appear as output signals when they receive a logic level "L" signal.

A series circuit of inverters 52 and 53 constitutes a timing control circuit. The timing control circuit is of such a type that, when a system drive clock pulse CLK is input to the series circuit of the inverters 52 and 53, level-inverted HIGH and LOW signals, that is, two types of drive signals $\bar{\phi}$ (inverted signal) and $\phi$ are obtained in an in-phase relation.

The drive clock signal $\phi$ serves as a drive clock for driving the tri-state gates 11 and 12 and the drive clock signal $\bar{\phi}$ (inverted signal) serves as a drive clock for the tristate gates 21 and 22. For this reason, when the tri-state gates 11 and 12 are in the operative state, the tri-state gates 21 and 22 are in the inoperative state. When the tri-state gates 11 and 12 are in the inoperative state, the tri-state gates 21 and 22 are in the operative state.

Input data DI is supplied via the tri-state gate 21 and forwarded via the inverter 51, tri-state gate 12 and AND gate 31 NOR gate 41. The tri-state gate 11 is connected in reverse-parallel with an inverter 51. With the clock pulse CLK in the logic level "L", the flip-flop circuit receives the input data DI. The received data DI is held as hold data DT by the reverse parallel circuit of the inverter 51 and tri-state gate 11 and is delivered as an output when the clock pulse CLK becomes a logic level "H".

The output data is delivered as output data DO to an outside circuit via a series circuit of AND circuit 31 and NOR gate 41. The tri-state AND gate 22 is connected in reverse parallel with the series circuit of the AND gate 31 and NOR gate 41. During the "L" period of the clock pulse CLK, the output data of the NOR gate 41 is fed back to the AND gate 31, holding an output of the series circuit of the AND gate 31 and NOR gate 41.

Upon receipt of a preset signal PST (the logic level "H"), the AND gate 31 allows the passage of an input signal which is received at the other terminal thereof and, upon receipt of a preset signal (the logic level "L"), produces an output "L". Upon receipt of the reset signal RST (the logic level "H"), the NOR gate 41 clears the hold data of the reverse parallel circuit of the AND gate 31, NOR gate 41 and tri-state gate 22.

The operation of the aforementioned circuit will be explained below, by way of example, by referring to the timing chart shown in FIG. 4.

Upon receipt of a clock pulse CLK (see FIG. 4B), the timing control circuit generates drive clock signal $\bar{\phi}$ and $\phi$. The flip-flop circuit of FIG. 3 is operated by applying the drive clock signals $\bar{\phi}$ and $\phi$ to the tristate gates 21, 22 and 11, 12, respectively.

With the preset signal PST (see FIG. 4C) and reset signal RST (see FIG. 4D) in the logic levels "H" and "L", respectively, input data DI (see FIG. 4A) is taken out in the circuit of FIG. 3 via the tri-state gate 21 when the clock pulse CLK is varied to the logic level "L". The input data DI thus taken is held, as held data DT (see FIG. 4E), by the reverse parallel circuit of the inverter 51 and tri-state gate 11.

At this time, the clock pulse CLK is in the logic level "L" and the tri-state gate 22 is placed in the inoperative state and hence the hold data is not delivered as an output.

With the clock pulse CLK in the logic level "H", the tri-state gate 21 is placed in an inoperative state and, instead, the tri-state gate 22 is operated, allowing the hold data DT to be delivered as an output of the gate 22 to the AND gate 31.

The hold data DT is output as sampling output data DO to an output terminal via the AND gate 31 and NOR gate 41. During the logic level "L" of the clock pulse CLK, the sampling output data DO of the output terminal is fed back to the AND gate 31 and supplied via the series circuit of the AND gate 31 and NOR gate 41 to the output terminal. In this way, the output data DO is held.

With the clock pulse in the "L" level, the next input data DI is received by the flip-flop circuit DI and is held as hold data DT by the reverse parallel circuit of the inverter 51 and tri-state gate 11. With the clock pulse CLK in the "H" level, the hold data DT is delivered as an output via the series circuit of the AND gate 31 and NOR gate 41.

The tri-state gate 22 is connected in reverse parallel with the series circuit of the AND gate 31 and NOR gate 41. With the drive clock signal $\phi$ in the logic state "L", the output data of the NOR gate 41 is fed back to the AND gate 31, holding the output of the series circuit of the AND gate 31 and NOR gate 41. In synchronism with the clock pulse CLK, the input data DI is sampled and output.

Since the sampling circuit utilizes the operation of the D type flip-flop, it holds the input data at the time of a synchronizing clock pulse and operates such that the hold data held by the clock pulse prior to a one-clock time is used as an output of the sampling circuit. For this case, the resolution time corresponds to the pulse width of the clock pulse CLK which is the sampling clock. The sampling clock becomes a sampling frequency. In order to obtain a target resolution, a high sampling frequency is required and hence a sampling clock of a corresponding frequency is necessary.

In the aforementioned conventional sampling circuit, in general, when digital data is to be sampled, it is necessary to use a clock pulse of a sampling frequency corresponding to double the bit rate of data for a synchronous system and a clock pulse of a sampling frequency corresponding to four-times the bit rate of data for an asynchronous system.

In the aforementioned conventional sampling circuit, it is necessary to use a sampling clock of 16 to 32 MHz if the bit rate of the data to be handled is, for example 8 Mbps.

If the sampling clock to be used becomes such a high frequency, it causes an operation error in a peripheral circuit due to a fine noise spike induced. In the peripheral circuit, therefore, proper preparation needs to be made against such a noise which might otherwise cause a serious problem in the peripheral circuit under an electromagnetic circumstance.

In recent times, higher and higher bit rate has been required for the data to be handled and hence a higher processing is necessary in view of such a tendency. If, under such a circumstance, use is made of a sampling clock of a frequency two-to four-times the data transfer rate as in the conventional sampling circuit, the peripheral circuit suffers a more serious electromagnetic problem.

There is growing demand for a sampling circuit which can operate with a sampling clock of a lower frequency and can obtain a higher resolution in the sampling of data.

SUMMARY OF THE INVENTION

A first object of the present invention to provide a sampling circuit device which, with a sampling clock of a low frequency, can perform a sampling operation equal to that with a high sampling frequency and can improve the electromagnetic circumstance around a peripheral circuit which might otherwise cause a problem due to a sampling clock.

In order to obtain the aforementioned object, a sampling circuit device is provided which comprises: a first sampling circuit including a first input gate driven by a clock pulse, for receiving input data when a clock pulse signal level is in a first state, first holding circuit for holding data which is received via the input gate, and a first output gate driven by the clock pulse, for delivering hold data of the first holding circuit when the clock pulse signal level is in a second state, and a second sampling circuit including a second input gate driven by a clock pulse, for receiving the data when the clock pulse signal level is in the second state, a second holding circuit for holding the data which is received via the second input gate, and a second output gate for delivering the hold data of the first holding circuit when the clock pulse signal level is in the first state.

Upon receipt of a clock pulse and data, the aforementioned circuit performs a sampling operation in synchronism with the clock pulse so as to sample data in a way as will be set forth below. That is, the first sampling circuit is of such a type that the first input gate receives the data when an input clock pulse signal level is in a first state (for example, "H"), the first holding circuit receives the data through the first input gate and holds it as hold data and the first output gate delivers the hold data as an output when the input clock pulse signal level is a second state.

The second sampling circuit is of such a type that the second input gate receives input data when an input clock signal level is a second state ("L"), the second holding circuit holds the data which is received through the second input gate and the second output gate for delivering the hold data of the second holding circuit as an output when the input clock pulse signal level is in a first state ("H"). That is, when the clock pulse signal level is in the first state, the first sampling circuit performs a sampling operation. At this time, the second sampling circuit delivers the data which is held at a previous sampling operation as an output. When the clock pulse signal level is in a second state, the second sampling circuit performs a sampling operation and, at this time, the first sampling circuit delivers the data which is held at a previous sampling time as an output. In this way, the sampling circuit device performs a repetitive operation.

Thus, since an unsampled one of the aforementioned two sampling circuits produces an output through a corresponding output gate, it is possible to obtain a sampling frequency which is double that of the sampling clock.

According to the present invention, a high sampling frequency can be obtained with a low-frequency sampling clock and it is possible to improve an electromagnetic circumstance around the peripheral circuit which might otherwise cause a problem resulting from the presence of a sampling clock.

A second object of the present invention is to provide a sampling circuit device which can forcefully output "H" or "L" data, in place of a sampled data output, during a sampling operation as required with respect to a peripheral circuit.

In order to achieve an object of the present invention, a data control circuit is provided for this sampling circuit device as will be set forth below. That is, data control circuit is added to the sampling circuit and is of such a type that it is operated in accordance with a control signal and delivers predetermined data as an output in place of the hold data of the first and second holding circuits.

This circuit device achieves not only the first object but also the following object of the present invention. That is, upon receipt of a control signal, the data control circuit is operated in accordance with the control signal and delivers predetermined data in place of the hold data of the first and second holding circuit. It is, therefore, possible to provide predetermined data irrespective of the input data.

BRIEF DESCRIPTION OF THE DRAWINGS

FIGS. 2A to 2G form a timing chart for explaining the operation of the circuit shown in FIG. 1;

FIGS. 4A to 4F form a timing chart for explaining the operation of the circuit of FIG. 3.

DETAILED DESCRIPTION OF THE PREFERRED EMBODIMENTS

Figure 1:
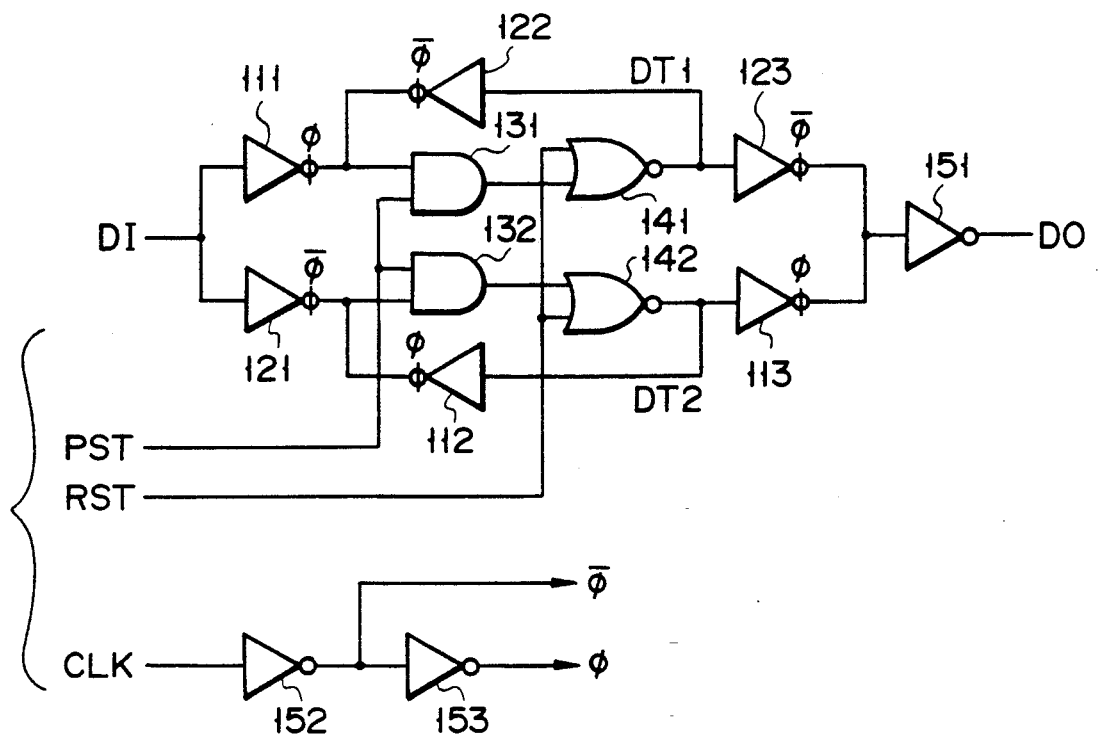
FIG. 1 is a circuit arrangement showing a sampling circuit according to one embodiment of the present invention.
Figure 3:
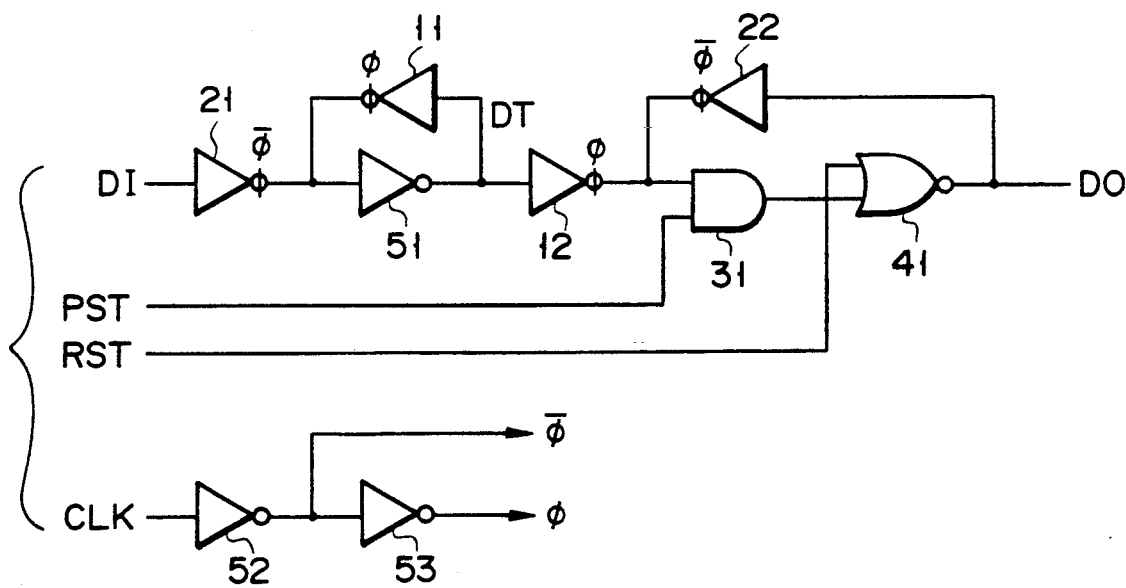
FIG. 3 is a circuit arrangement showing one form of a conventional sampling circuit.

FIG. 1 is a circuit arrangement showing a sampling circuit according to the present invention. As shown in FIG. 1, use is made of control gate-equipped tri-state inverters 111, 112, 113, 121, 122 and 123. When a logic level "H" signal is applied to the control gates of the inverters 111, 112, 113, 121, 122 and 123, they can have their own input signals prevented from emerging as their own outputs. When a logic level "L" signal is applied to the control gates of these inverters, they can have their own inputs emerge as their own outputs.

A series circuit of inverters 152 and 153 constitutes a timing control circuit. By inputting a clock pulse CLK to drive to a series circuit of inverters 152 and 153, the timing control circuit obtains two types of polarityinverted drive clock signal $\bar{\phi}$ and $\phi$ in an in-phase relation.

Of these clock signals, the drive clock signal $\phi$ is used to drive the tri-state gates 111, 112 and 113 and the drive clock signal $\bar{\phi}$ is used to drive the tri-state gates 121, 122 and 123. For this reason, with the tri-state gates 111 to 113 in the operative state, the tri-state gates 121 to 123 is rendered in an inoperative state, and with the tri-state gates 111 to 113 in the inoperative state the tri-state gates 121 to 123 are rendered in an operative state.

In the circuit arrangement shown in FIG. 1, use is made of two types of sampling circuit sections. In one type of sampling circuit section, input data DI is supplied via the tri-state gate 111 and series circuit of an AND gate 131 and NOR gate 141 to the tri-state gate 123 where it is delivered as an output. The series circuit of AND gate 131 and NOR gate 141 is connected in reverse parallel with the tri-state gate 122. When a clock pulse CLK goes high, the first type sampling circuit section receives the input data DI which is held, as hold data DT1, in a reverse parallel circuit comprised of the series-circuit of AND gate 131 and NOR gate 141 and tri-state gate 122 When the clock pulse CLK goes low, the hold data DT1 is delivered as an output.

While a drive clock signal which is applied to the control gate of the tri-state gate 122 in the aforementioned reverse parallel circuit holds a logic level "L", the tri-state gate 122 feeds the output data of the NOR gate 141 back to the AND gate 131 in the reverse parallel circuit, holding an output in the series circuit of the AND gate 131 and NOR gate 141.

Upon receipt of a preset signal PST of a logic level "H", the AND gate 131 gates a signal and upon receipt of a reset signal RST of a logic level "H" the NOR gate 141 clears the hold data of the aforementioned reverse parallel circuit.

In the second type sampling circuit section, the input data DI is supplied via a series circuit of an AND gate 132 and NOR gate 142 to the tri-state gate 113 where it is delivered as an output. Furthermore, the tri-state gate 112 is connected in reverse parallel to the series circuit of the AND gate 132 and NOR gate 142. When the clock pulse CLK goes low, the second type sampling circuit section receives input data DI which in turn is held, as hold data DT2, in the reverse parallel circuit comprised of the series circuit of the AND gate 132 and NOR gate 142 and tri-state gate 112. The second type sampling circuit section delivers the hold data DT2 when the clock pulse CLK goes high.

With the input clock pulse in the logic state "H", the output data of the NOR gate 142 in the aforementioned reverse parallel circuit is fed back to the AND gate 132 via the gate 112, holding an output in the series circuit of the AND gate 132 and NOR gate 142.

The AND gate 132, upon receipt of the preset signal PST of a logic level "H" at one terminal thereof, allows the passage of a signal which is input to the other input thereof. When a reset signal RST of the logic level "H" is supplied to one input terminal of the NOR gate 142, the gate 142 clears the hold data in the aforementioned reverse parallel circuit. An inverter 151, upon receiving an output of each sampling circuit section, has its output reversed and supplies an inverted replica as the final output data to an output terminal.

The inverter 151 is provided for the reason as set forth below. That is, the original input data has its logic level coincide in logic level with that final output data because the two sampling circuit sections are of such a type that the signal as set forth above is processed in an inverted fashion.

The operation of the aforementioned circuit will be explained below, by way of example, by referring to FIG. 2.

Upon being supplied with a clock pulse CLK (see FIG. 2B), the timing control circuit generates drive clock signals $\bar{\phi}$, $\phi$. The drive clock signals $\phi$ and $\bar{\phi}$ are supplied as control signals to tri-state gates 111 to 113 and 121 to 123, respectively, thus operating the circuit shown in FIG. 1.

Suppose that the preset signal PST (see FIG. 2C) and reset signal RST (see FIG. 2D) are in the logic levels "H" and "L", respectively. At the time when the clock pulse CLK varies to the logic level "L", the input data DI (see FIG. 2A) is supplied to the tri-state gate 111 in the first sampling circuit section. The input data DI is supplied via the series circuit of the AND gate 131 and NOR gate 141 to the tri-state gates 122 and 123. At this time, the tri-state gates 122 and 123 and the tri-state gate 121 in the second type sampling circuit section are placed in the inoperative state, so that the holding of the data by the tri-state gate 122, as well as the sampling of the signal by the second type sampling circuit section, is not performed.

When the clock pulse CLK changes from "H", the input data DI is received by the second type sampling circuit section via the tri-state gate 121 and supplied to the tri-state gates 112 and 113 via the series circuit of the AND gate 132 and NOR gate 142.

At this time, the tri-state gates 112 and 113 and the tri-state gate 111 in the first type sampling circuit section are placed in the inoperative state so that the holding of the data by the tri-state gate 122, as well as the sampling of the signal by the first type sampling circuit section, are carried out. Since the tri-state gates 122 and 123 in the first type sampling circuit section are placed in the operative state, the hold data DT1 (see FIG. 2E) which is previously sampled in the first type sampling circuit section is held in the corresponding reverse parallel circuit and, at the same time, delivered as output data (see FIG. 2G) to the output terminal via the tri-state gate 123 and inverter 151.

When the input clock pulse CLK changes from "H" to "L", the input data DI is received in the first sampling circuit section via the tri-state gate 111 and transmitted via the series circuit of the AND gate 131 and NOR gate 141 to the tri-state gates 122 and 123.

At that time, the tri-state gates 122 and 123 and the tristate gate 121 in the second type sampling circuit section are in the inoperative state and hence the holding of the data by the first type sampling circuit section and the sampling operation of the signal by the first type sampling circuit is placed in the operative state. Therefore, the hold data DT2 (see FIG. 2F) which is previously held by the second type sampling circuit section is held in the reverse parallel circuit of the second type sampling circuit section and at the same time sent as output data (see FIG. 2G) to the output terminal via the tri-state gate 113 and inverter 151.

The input data DI is sampled in synchronism with the logic levels "H" and "L" and delivered as an output. If the circuit shown in FIG. 1 receives a reset signal RST (see FIG. 2D) of a logic level "H", the NOR gates 141 and 142 are cleared and the hold data DT1 and DT2 of the tri-state gates 112 and 122 are lost, resulting in a reset operation.

With the preset signal PST (see FIG. 2C) in the logic level "L", the outputs of the AND gates 131 and 132 become a logic level "L" and the hold data DT1 and DT2 which are held by the tri-state gates 112 and 122 are held in the logic level "H" until the next input data DI is received.

In this type of sampling circuit, the two sampling circuit sections serve as a D type flip-flop, respectively, one being operated in synchronism with a clock pulse of a logic level "H" and the other in synchronism with a clock pulse of a logic level "L".

The individual resolution of the two sampling circuit sections corresponds to the width of the clock pulse CLK, that is, the sampling clock, the operation timing of one of the two sampling circuit sections corresponding to the logic level "H" of the sampling clock and the other to the logic level "L" of the sampling clock. Therefore, a resultant force of both becomes double the sampling frequency of the sampling clock, thus obtaining double the resolution of the sampling clock.

In order to obtain a target resolution, it is only necessary to use a clock pulse whose frequency is one-half the target sampling frequency. It is thus possible to improve the electromagnetic environment around the peripheral circuit to the extent to which a clock pulse of low frequency can be employed as a drive pulse.

The present system comprises a first sampling means composed of a first input gate for receiving input data when an input clock pulse is in a logic level "H", a first holding means for holding the data which is received via the input gate and a first output gate for outputting hold data of the first holding means when the input clock pulse is in the logic level "L", and a second sampling means composed of a second input gate for receiving input data when the input clock pulse is in the logic level "L", a second holding means for holding data via the second input gate and a second output gate for outputting hold data of the first holding means when the input clock pulse is in the logic level "H".

The first sampling means receives data from the first input gate when the input clock pulse is in the logic level "H". The first holding means holds data which is supplied via the first input gate. When the input clock pulse is in the logic level "L", the hold data of the first holding means is output via the first output gate. When the input clock pulse is in the logic level "L", the second sampling means receives data via the second input gate and the second holding means holds the data which is received via the second input gate. When the input clock pulse is in the logic level "H", the hold data of the second holding means is output from the second output gate.

That is, when the clock pulse is in the logic level "H", the first sampling means performs a sampling operation at which time the second sampling means delivers the data which has been previously sampled and held. When the clock pulse is in the logic level "L", the second sampling means performs a sampling operation and, at this time, the first sampling means delivers the data which has been previously sampled and held. In this way, the aforementioned operation is repeated. Since, however, the output of one sampling means of the two which is not in the sampled state is delivered via the corresponding output gate, it is possible to obtain double the sampling frequency of the sampling clock and hence to perform a high-resolution data sampling operation with a sampling clock pulse of low frequency.

According to the present invention, a high sampling frequency is obtained with a sampling clock pulse of low frequency and hence a sampling circuit can be provided which can improve the electromagnetic environment around the peripheral circuit in spite of the presence of the sampling clock.

The embodiment shown in FIG. 1 has the preset and reset functions which are required in designing the peripheral circuit. Of these functions, the preset function is required in the case where an output is desired to be rendered in the logic level "H" while a preset signal is supplied to the circuit. The reset function, on the other hand, is required in the case where an output is desired to be rendered in the logic level "L" while a reset signal is supplied to the circuit. If, therefore, either one or both the functions as set out above are not required, the corresponding component parts can be emitted.

For example, the AND gates 131 and 132 may be omitted if the preset function is omitted and the NOR gates 141 and 142 may be omitted if the reset function is omitted. In the latter case, an inverter needs to be inserted in the circuit in place of the NOR gates 141 and 142 because the circuit shown in FIG. 1 is of such a logic configuration type as to invert the data. If, therefore, the circuit is of such a logic configuration type that the data is not inverted, then such an inverter as set out above and hence the inverter 151 at the final output stage will naturally be unnecessary.

Although, in the aforementioned embodiment, an output is made in the logic level "H" by the preset function while a preset signal is applied to the circuit, it may be made in the logic level "L" as required. Likewise, the output is made in the logic level "L" by the reset function while a reset signal is applied to the circuit of FIG. 1, but it may be made in the logic level "H" as required.

The present invention is not restricted to the aforementioned embodiment and may be changed or modified without departing from the spirit and scope of the present invention.

What is claimed is:

1. A sampling circuit comprising:

first sampling means, responsive to a clock pulse, having a signal level, for receiving input data when the clock pulse signal level is in a first state, the first sampling means comprising a first input gate driven by the clock pulse; first holding means for holding the input data which is received via said first input gate; and a first output gate, driven by the clock pulse, for delivering hold data of said first holding means when the clock pulse signal level is in a second state;

second sampling means, responsive to the clock pulse, for receiving the input data when the clock pulse signal level is in the second state, the second sampling means comprising a second input gate driven by the clock pulse; second holding means for holding the input data which is received via said second input gate; and a second output gate for delivering the hold data of said second holding means when the clock pulse signal level is in the first state; and data control means, operated by an external control signal, for delivering the data held in the first and second holding means to the first and second output gates when the external control signal is not present; for inhibiting delivery of the data held in the first and second holding means to the first and second output gates when the external control signal is present; and for delivering predetermined data to the first and second output gates when the external control signal is present.

2. The sampling circuit according to claim 1, wherein when the external control signal is a preset signal, said data control means delivers the predetermined data having a predetermined level.

3. The sampling circuit according to claim 1, wherein when the external control signal is a reset signal, said data control means generates the predetermined data having a predetermined level.

4. The sampling circuit according to claim 1, wherein the external control signal has a preset signal and a reset signal, and said data control means delivers the predetermined data having a first level in response to the preset signal and the predetermined data having a second level in response to the reset signal.

5. The sampling circuit according to claim 1, wherein said first and second input gates, said first and second holding means and said first and second output gates have respective control gates controlled by the clock pulse and constitute an inverter logic circuit; said data control means comprises first and second gate circuits having respective gates controlled by said control means; said first and second input gates have input terminals supplied with the input data; said first input gate has an output terminal connected via said first gate circuit in said data control means to input terminals of said first output gate and first holding means; said first holding means has an output terminal connected to output terminal of said first input gate; said second input gate has an output terminal connected via said gate circuit in said data control means to inputs of said second output gate and second holding means; said second holding means has an output terminal connected to said output terminal of said second input gate; said first input gate, second holding means and second output gate are operated when the clock pulse supplied to their control gates has a signal level of the first state; and said second input gate, first holding means and first output gate are operated when the clock pulse supplied to their control gates has a signal level of the second state.

6. A sampling circuit comprising:
first sampling means, responsive to a clock pulse, for receiving input data when the clock pulse has a first level, the first sampling means comprising a first input gate driven by the clock pulse: first holding means for holding the input data which is received via said first input gate; and a first output gate driven by the clock pulse to output the hold data of said first holding means when the clock pulse has a second level; and
second sampling means, responsive to the clock pulse, for receiving the input data when the clock pulse has the second level, the second sampling means comprising a second input gate driven by the clock pulse; second holding means for holding data which is received via said second input gate; and a second output gate driven by the clock pulse to output the hold data of said second holding means when the clock pulse has the first level; and
wherein the first and second input gates, the first and second holding means, and the first and second output gates have respective gates controlled by the clock pulse and constitute an inverter logic circuit; the first and second input gates have input terminals supplied with the input data; the first input gate has an output terminal connected to inputs of said first output gate and the first holding means; the first holding means have an output terminal connected to the output terminal of the first input gate; the second input gate has an output terminal connected to inputs of the second output gate and the second holding means; the second holding means has an output terminal connected to the output terminal of the second input gate, the first input gate, and the second holding means; the second output gate is operated when the clock pulse, supplied to their control gates, is at the first level; and the second input gate, the first holding means, and the first output gate is operated when the clock pulse, supplied to their control gates, is at the second level.

7. An input data sampling method, for use in a data sampling apparatus having a single input terminal and a single output terminal, and for sampling data input from the single input terminal and outputting sampled data through the single output terminal, the sampling method comprising the steps of:
receiving, upon receipt of a clock pulse signal level in a first state, data input from the single input terminal, in synchronism with a clock pulse, of a frequency, and holding it as first hold data;
outputting the first hold data through the single output terminal when a signal level of the clock pulse signal is in a second state;
receiving the data input from the single input terminal when the signal level of the clock pulse is in the second state and holding it as second hold data;
outputting the second hold data through the single output terminal when the signal level of the clock pulse is in the first state; and
outputting, in place of the first and second hold data, predetermined data in accordance with a control signal; wherein
the first and second hold data and the predetermined data are outputted as output data to the single output terminal at a frequency of up to twice the frequency of the clock pulse.

8. The method according to claim 7, wherein the control signal is a preset signal.

9. The method according to claim 7, wherein the control signal is a reset signal.

10. The method according to claim 7, wherein the predetermined data has selectively first and second states, and the control signal comprises one of a preset signal and a reset signal, whereby the predetermined data has the first state when the control signal is the preset signal and the second state when the control signal is the reset signal.

* * * * *